United States Patent
Alchemy

(10) Patent No.: US 12,165,209 B1
(45) Date of Patent: Dec. 10, 2024

(54) METHOD OF AND SYSTEM FOR PROVIDING A CONFIDENCE MEASUREMENT IN THE IMPAIRMENT RATING PROCESS

(71) Applicant: Alchemy Logic Systems Inc., Santa Rosa, CA (US)

(72) Inventor: John William Alchemy, Santa Rosa, CA (US)

(73) Assignee: Alchemy Logic Systems Inc., Santa Rosa, CA (US)

( * ) Notice: Subject to any disclaimer, the term of this patent is extended or adjusted under 35 U.S.C. 154(b) by 0 days.

(21) Appl. No.: 16/124,960

(22) Filed: Sep. 7, 2018

Related U.S. Application Data

(60) Provisional application No. 62/560,597, filed on Sep. 19, 2017.

(51) Int. Cl.
*G06Q 40/08* (2012.01)
*G06Q 10/0639* (2023.01)

(52) U.S. Cl.
CPC ....... *G06Q 40/08* (2013.01); *G06Q 10/06393* (2013.01)

(58) Field of Classification Search
CPC .......... G06Q 40/08; G06Q 10/06393
See application file for complete search history.

(56) References Cited

U.S. PATENT DOCUMENTS

| | | | |
|---|---|---|---|
| 4,916,611 A | 4/1990 | Doyle, Jr. et al. | |
| 4,987,538 A | 1/1991 | Johnson et al. | |
| 5,182,705 A | 1/1993 | Barr et al. | |
| 5,367,675 A | 11/1994 | Cheng et al. | |

(Continued)

FOREIGN PATENT DOCUMENTS

| | | | |
|---|---|---|---|
| CA | 2707207 A1 | 6/2009 | |
| WO | WO2008006117 A2 | 1/2008 | |
| WO | WO2018224937 A1 | 12/2018 | |

OTHER PUBLICATIONS

Park, Y., Butler, R. J. (2000). Permanant Partial Disability Awards and Wage Los. Journal of Risk and Insurance, 67(3), 331. Retrieved from https//dialog.proquest.com/professional/docview/769439682, Year 2000, 18 pages.

(Continued)

*Primary Examiner* — Scott S Trotter
*Assistant Examiner* — William D Newlon
(74) *Attorney, Agent, or Firm* — Haverstock & Owens, A Law Corporation

(57) ABSTRACT

A method and system for calculating a deficiency analysis that provides a percentage of missing data for an impairment rating based on an observed data set. Comparing an observed data set with an ideal data set based on one or more administrative rule sets for an injury event allows one or more stakeholders within the workers compensation process to obtain a risk score and/or deficiency report for the observed data and the resulting impairment rating. One or more risk scores and/or deficiency reports can be used to track quality and consistency of a clinician and quality and consistency across a medical provider network. After a risk score for an impairment rating is output, the risk score can be uploaded to a historical evaluation database for a percentile creation against other reports of similar body systems.

27 Claims, 4 Drawing Sheets

(56) References Cited

U.S. PATENT DOCUMENTS

| | | |
|---|---|---|
| 5,517,405 A | 5/1996 | McAndrew et al. |
| 5,544,044 A * | 8/1996 | Leatherman ............ G16H 20/10 |
| | | 705/2 |
| 5,613,072 A | 3/1997 | Hammond |
| 5,778,345 A | 7/1998 | McCartney |
| 5,911,132 A | 6/1999 | Sloane |
| 6,003,007 A | 12/1999 | DiRienzo |
| 6,065,000 A | 5/2000 | Jensen |
| 6,604,080 B1 | 8/2003 | Kern |
| 6,810,391 B1 | 10/2004 | Birkhoelzer et al. |
| 6,865,581 B1 | 3/2005 | Cloninger, Jr. |
| 6,954,730 B2 | 10/2005 | Lau et al. |
| 6,957,227 B2 * | 10/2005 | Fogel ................. G06F 16/2365 |
| | | 707/999.102 |
| 7,337,121 B1 | 2/2008 | Beinet |
| 7,401,056 B2 | 7/2008 | Kam |
| 7,440,904 B2 | 10/2008 | Hasan et al. |
| 7,475,020 B2 | 1/2009 | Hasan et al. |
| 7,509,264 B2 | 3/2009 | Hasan et al. |
| 7,630,911 B2 | 12/2009 | Kay |
| 7,630,913 B2 | 12/2009 | Kay |
| 7,707,046 B2 | 4/2010 | Kay |
| 7,707,047 B2 | 4/2010 | Hasan et al. |
| 7,778,849 B1 | 8/2010 | Hutton |
| 7,813,944 B1 | 10/2010 | Luk |
| 7,870,011 B2 | 1/2011 | Kay |
| 7,904,309 B2 | 3/2011 | Malone |
| 7,930,190 B1 | 4/2011 | Milanovich |
| 7,949,550 B2 | 5/2011 | Kay |
| 7,970,865 B2 | 6/2011 | DeCesare et al. |
| 8,019,624 B2 | 9/2011 | Malone |
| 8,041,585 B1 | 10/2011 | Binns et al. |
| 8,065,163 B2 | 11/2011 | Morita et al. |
| 8,069,066 B2 | 11/2011 | Stevens et al. |
| 8,185,410 B2 | 5/2012 | Brigham |
| 8,301,575 B2 | 10/2012 | Bonnet et al. |
| 8,346,573 B2 | 1/2013 | Glimp et al. |
| 8,489,413 B1 | 7/2013 | Larson et al. |
| 8,489,424 B2 | 7/2013 | Hasan et al. |
| 8,510,134 B1 | 8/2013 | Sweat et al. |
| 8,527,303 B2 | 9/2013 | Kay |
| 8,615,409 B1 | 12/2013 | McKown |
| 8,630,878 B1 | 1/2014 | Kravets et al. |
| 8,725,524 B2 | 5/2014 | Fano |
| 8,725,538 B2 | 5/2014 | Kay |
| 8,751,252 B2 | 6/2014 | Chamberlain |
| 8,751,263 B1 | 6/2014 | Cave et al. |
| 8,751,266 B2 | 6/2014 | Stang |
| 8,775,216 B1 | 7/2014 | Amick et al. |
| 8,864,663 B1 | 10/2014 | Kahn et al. |
| 8,868,768 B2 | 10/2014 | Sokoryansky |
| 8,888,697 B2 | 11/2014 | Bowman et al. |
| 8,900,141 B2 | 12/2014 | Smith et al. |
| 8,910,278 B2 | 12/2014 | Davne et al. |
| 8,930,225 B2 | 1/2015 | Morris |
| 8,959,027 B2 | 1/2015 | Kusens |
| 8,954,339 B2 | 2/2015 | Schaffer |
| 9,002,719 B2 | 4/2015 | Tofte |
| 9,015,055 B2 | 4/2015 | Tirinato et al. |
| 9,020,828 B2 | 4/2015 | Heidenreich |
| 9,031,583 B2 | 5/2015 | Pereira |
| 9,229,917 B2 * | 1/2016 | Larcheveque ........ G06F 21/566 |
| 9,710,600 B1 | 7/2017 | Dunleavy |
| 11,461,848 B1 | 10/2022 | Alchemy |
| 11,625,687 B1 | 4/2023 | Alchemy |
| 11,848,109 B1 | 12/2023 | Alchemy |
| 11,853,973 B1 | 12/2023 | Alchemy |
| 11,854,700 B1 | 12/2023 | Alchemy |
| 2001/0027331 A1 * | 10/2001 | Thompson ......... A61N 1/37282 |
| | | 607/60 |
| 2001/0044735 A1 | 11/2001 | Colburn |
| 2001/0053984 A1 | 12/2001 | Joyce |
| 2002/0069089 A1 | 6/2002 | Larkin |
| 2002/0077849 A1 | 6/2002 | Baruch |
| 2004/0044546 A1 | 3/2004 | Moore |
| 2005/0060184 A1 | 3/2005 | Wahlbin |
| 2005/0177403 A1 * | 8/2005 | Johnson ............... G06Q 20/201 |
| | | 705/20 |
| 2005/0256744 A1 | 11/2005 | Rohde |
| 2006/0161456 A1 * | 7/2006 | Baker ...................... G16Z 99/00 |
| | | 705/2 |
| 2006/0287879 A1 | 12/2006 | Malone |
| 2007/0118406 A1 | 5/2007 | Killin |
| 2007/0250352 A1 | 10/2007 | Tawil |
| 2008/0046297 A1 | 2/2008 | Shafer |
| 2008/0133297 A1 | 6/2008 | Schmotzer |
| 2008/0154672 A1 | 6/2008 | Skedsvold |
| 2008/0183497 A1 | 7/2008 | Soon-Shiong |
| 2009/0099875 A1 | 4/2009 | Koeniq |
| 2010/0042435 A1 | 2/2010 | Kay |
| 2010/0106520 A1 | 4/2010 | Kay |
| 2010/0106526 A1 | 4/2010 | Kay |
| 2010/0114609 A1 * | 5/2010 | Duffy, Jr. ............... G06Q 10/10 |
| | | 705/3 |
| 2010/0217624 A1 | 8/2010 | Kay |
| 2010/0240963 A1 | 9/2010 | Brighman |
| 2011/0077980 A1 | 3/2011 | Kay |
| 2011/0077981 A1 | 3/2011 | Kay |
| 2011/0145012 A1 | 6/2011 | Nightingale |
| 2011/0161115 A1 | 6/2011 | Hampton |
| 2011/0257919 A1 * | 10/2011 | Reiner .................... G06F 16/51 |
| | | 702/81 |
| 2011/0257993 A1 | 10/2011 | Shahani |
| 2011/0313785 A1 | 12/2011 | Lash |
| 2011/0313912 A1 | 12/2011 | Teutsch |
| 2012/0022884 A1 | 1/2012 | Chillemi |
| 2012/0102026 A1 | 4/2012 | Fortune |
| 2012/0130751 A1 | 5/2012 | McHugh |
| 2012/0232924 A1 * | 9/2012 | Bingham ......... G06Q 10/06398 |
| | | 705/2 |
| 2012/0245973 A1 | 9/2012 | Pandya |
| 2012/0278095 A1 | 11/2012 | Homchowdhury |
| 2012/0280931 A1 | 11/2012 | Stephanick |
| 2012/0284052 A1 | 11/2012 | Saukas |
| 2013/0024214 A1 | 1/2013 | Schoen et al. |
| 2013/0132122 A1 | 5/2013 | Walsh |
| 2014/0052465 A1 | 2/2014 | Madan |
| 2014/0058763 A1 | 2/2014 | Zizzamia |
| 2014/0073486 A1 | 3/2014 | Ahmed |
| 2014/0136216 A1 | 5/2014 | Beebe |
| 2014/0172439 A1 | 6/2014 | Conway et al. |
| 2014/0201213 A1 | 7/2014 | Jackson |
| 2014/0249850 A1 | 9/2014 | Woodson |
| 2014/0278479 A1 | 9/2014 | Wang et al. |
| 2014/0278830 A1 | 9/2014 | Gagne |
| 2014/0303993 A1 | 10/2014 | Florian |
| 2014/0379364 A1 * | 12/2014 | Liu ......................... G16H 15/00 |
| | | 705/2 |
| 2015/0019234 A1 * | 1/2015 | Cooper ............ G06Q 10/06393 |
| | | 705/2 |
| 2015/0221057 A1 | 8/2015 | Raheja et al. |
| 2015/0235334 A1 | 8/2015 | Wang et al. |
| 2015/0242585 A1 | 8/2015 | Spiegel |
| 2015/0278462 A1 * | 10/2015 | Smoley ................... G06Q 40/08 |
| | | 705/2 |
| 2015/0286792 A1 | 10/2015 | Gardner |
| 2015/0324523 A1 * | 11/2015 | Parthasarathy ........ G16H 15/00 |
| | | 705/2 |
| 2016/0063197 A1 | 3/2016 | Kumetz |
| 2016/0110334 A1 * | 4/2016 | Yu ........................ G06F 11/0769 |
| | | 715/223 |
| 2016/0125544 A1 | 5/2016 | Edwards |
| 2016/0259499 A1 | 9/2016 | Kocienda |
| 2016/0283676 A1 * | 9/2016 | Lyon ...................... G16H 10/20 |
| 2016/0292371 A1 | 10/2016 | Alhimin |
| 2016/0342745 A1 * | 11/2016 | Gupta .................... G16H 20/10 |
| 2017/0140489 A1 | 5/2017 | Ziobro |
| 2017/0154374 A1 | 6/2017 | Iglesias |
| 2017/0177810 A1 | 6/2017 | Fulton |
| 2017/0228517 A1 | 8/2017 | Saliman |
| 2017/0255754 A1 | 9/2017 | Allen |
| 2017/0286389 A1 * | 10/2017 | Ceneviva ............... G06F 40/106 |
| 2017/0316424 A1 | 11/2017 | Messana |

(56) References Cited

U.S. PATENT DOCUMENTS

| | | |
|---|---|---|
| 2017/0352105 A1 | 12/2017 | Billings |
| 2018/0025334 A1 | 1/2018 | Pourfallah |
| 2018/0279919 A1 | 10/2018 | Bansbach |
| 2019/0065686 A1 | 2/2019 | Crane |
| 2019/0159747 A1* | 5/2019 | Zanca .................... G16H 30/40 |
| 2020/0126645 A1 | 4/2020 | Robbins |
| 2020/0279622 A1 | 9/2020 | Heywood |
| 2020/0286600 A1* | 9/2020 | De Brouwer .......... G16H 50/20 |
| 2022/0391993 A1 | 12/2022 | Alchemy |
| 2023/0196297 A1 | 6/2023 | Alchemy |

OTHER PUBLICATIONS

Rondinelli, Robert D., Guides to the Evaluation of Permanent Impairment, 2008 Sixth Edition, American Medical Association.

Cocchiarella, Linda and Andersson, Gunnar B. J., Guides to the Evaluation of Permanent Impairment, 2001 Fifth Edition, American Medical Association.

"Physician's Guide to Medical Practice in the California Worker's Compensation System", 2016, State of California Department of Industrial Relations Division of Worker's Compensation, 4th ed., all pages. (Year 2016).

Park, Y., & Butler, R.J. (2000), Permanent Partial Disability Awards and Wage Loss, Journal of Risk and Insurance, 67(3), 331, retrieved from https://dialog.proquest.com/professional/docview/769439682?accountid=142257 (Year: 2000).

In B. Pfaffenberger, Webster's new World Computer Dictionary (10th ed). Houghton Mifflin Harcourt, Credo reference:https://search.credoreference.com/content/entry/webster.com/database (year 2003).

Hakkinen, Arja, et al. "Muscle strength, pain, and disease activity explain individual subdimensions of the Health Assessment Questionaire disability index, especially in women with rheumatoid arthritis." Annals of the rheumatic diseases 65.1 (2006): 30-34. (Year: 2006).

"CA DWC Releases 4th Edition of Physician's Guide to Medical Practice in CA WC", Apr. 5, 2016, workcompwire.com, 7 pages.

Programming languages. (2004). In W. S. Bainbridge (Ed)., Berkshire encyclopedia of human-computer interaction. Berkshire Publishing Group. Credo Reference: https://search.credoreference.com/content/entry/berkencyhci/programming_languages/0? institutionid=743 (Year: 2004), 5 pages.

Ammendolia C. Cassidy D., Steensta I, et al. Designing a Workplace Return-to Work Program for Occupational Low Back Pain: an intervention mapping approach. BMC Musculoskelet Disord. 2009;10:65. Published Jun. 9, 2009. doi: 10.1186/1471-2474-10-65 (Year; 2009). 10 pages.

Wasiak, Radoslaw, et al. "Measuring Return To Work." Journal of Occupational Rehabilitation 17.4 (2007): 766-781. (Year: 2007). 16 pages.

* cited by examiner

310

Here's the Result %WPI for Dr. Tim's PR4 Report:

Rating Chapter: Lumbar Spine/15 The Spine

Lumbar Spine: DRE Method —311
DRE Category (I) is selected reasons of no ratable findings. Zero percent (0%) WPI is selected for impact on ADLs.

Lumbar Spine DRE Rating: (0%WPI) —312
Conditions Represented: None, (0)
Calculations: Table 1-2 Page 4, Box 15-1 Page 382, and Table 15-3 Page 384.

---

Lumbar Spine: Range-of-Motion Method —313

Element 1
Range-of-Motion (0%WPI)

Element 2
Diagnosis Based Table 15-7; Part (n/a); Sections (n/a); (0%WPI)

Element 3
Neurologic: (0%WPI)

Lumbar Spine ROM Rating (0%WPI) —314
Conditions Represented: None, (0)
Calculations: Table 15-7, Page 404, Table 15-8, Page 407, Table 15-9, Page 409, Table 15-15; 15-16, 15-18, Page 424, Table 17-37, Page 552. Combining alues Chart Page 604-606.

---

Final Lumbar Spine: (0%WPI) —315

Fig. 3A

Here's What RateFast Discovered About Tim's PR4 Report: Back to Tim. Here is Tim's RateFast Impairment Deficiency Report (TM):

RateFast Impairment Deficiency Report (TM)
Report ID: 56eb0d4422cda72c0505a9b6

Provider: Tim — 321

Practice: advsample

Date Submitted: 03/17/2016 — 323
Body System: Spine
Body Part: Lumbar — 325
Side: N/A — 327

Total Data Set Deficiency Score: 31.7%/D+ — 322
Section Analysis:
Subject Complaints Deficiency: 16.7%/B — 324
ADLs Deficiency: 0%/A+
Lumbar Medical History Deficiency: Not provided
Objective Findings Deficiency: 82.6%/F — 326
Diagnostic Testing Deficiency: Not provided

Fig. 3B

METHOD OF AND SYSTEM FOR PROVIDING A CONFIDENCE MEASUREMENT IN THE IMPAIRMENT RATING PROCESS

RELATED APPLICATIONS

This Patent application claims priority under 35 U.S.C. 119(e) of the U.S. provisional patent application, Application No. 62/560,597, filed on Sep. 19, 2017, and entitled "METHOD TO PROVIDE QUALITY CONFIDENCE MEASUREMENT IN IMPAIRMENT RATING PROCESS," which is hereby incorporated in its entirety by reference.

FIELD OF THE INVENTION

The present invention is generally directed to quantifying a confidence measurement for an impairment rating arising from a worker's compensation event. More specifically, the present invention is directed to a method and system for providing a confidence measurement for an impairment rating arising from gaps or omissions within an entered clinical data set.

BACKGROUND OF THE INVENTION

The impairment rating process involves a clinician examining an injured worker for functional deficiencies as a result of a work related injury event. One or more administrative rule sets (ARSs) based on the injury event guide the clinician through the examination process. The accuracy and the quality of a resultant impairment rating is directly dependent on the compliance of the clinician to the ARS for the injury event. The method and description of the ARSs are described within the U.S. patent application Ser. No. 14/996,067 (the '067 Application), which is hereby incorporated by reference.

A lack of compliance and/or rigor to the impairment rating process can arise from numerous causes. For example, the clinician may not have adequate training and unintentionally omit certain measurements or neglect to examine for other critical pathology. Alternatively, the clinician may be so experienced that the initial examination and discussion with the injured worker cause a subjective jump to an impairment rating without an appropriate and complete examination and clinical data to support for the assumed or estimated impairment value. Additionally, the clinician may not have an appreciation of the need for data replication to obtain a statistical confidence in the measurement. Further, the clinician may be time limited and unable to perform a proper examination. Moreover, a perceived cost of the proper examination my may be thought too expensive for the necessary level of pathology.

Additionally, the clinician may see one or more sections of the ARS as a loophole, excessive, confusing, or clinically cumbersome. Regardless of the reason for non-adherence to one or more of the ARSs by omitting a section of the data set used for an impairment rating, the clinician may output an impairment rating value that significantly alters the worker's compensation claim.

There are also numerous reasons why a clinician may not perform the examination to the appropriate rigor, including intentional misrepresentation of the functional deficiencies. The clinician may also inadvertently, not paying attention, enter incorrect values. These causes have been described in the '067 Application and are also incorporated by reference herein. Errors by the clinician administrating the ARS and the impairment rating process are carried forward in the worker's compensation process and a resultant maximal medical improvement (MMI) of the injured individual. Thus, small errors within the impairment rating process can translate to larger issues over time. Cost, the need for prophylactics and braces, retraining, compensation claims, and legal costs from challenged ratings can grow based on small errors in the process. Stake holders such as employers, insurance companies, clinics and the injured worker rely of the accuracy and quality of a completed data set and a proper impairment rating.

SUMMARY OF THE INVENTION

The present invention is directed to calculating a deficiency analysis that provides a percentage of missing data for an impairment rating based on an observed data set. Comparing an observed data set with an ideal data set based on one or more administrative rule sets for an injury event allows one or more stakeholders within the workers compensation process to obtain a risk score and/or deficiency report for the observed data set and the resulting impairment rating. One or more risk scores and/or deficiency reports can be used to track quality and consistency of a clinician and quality and consistency across a medical provider network. After a risk score for an impairment rating is output, the risk score can be uploaded to a historical evaluation database for a percentile creation against other reports of similar body systems.

In one aspect, a method of calculating a risk score for an impairment rating in a worker's compensation claim comprises performing one or more tests on an injured worker to obtain an observed data set, uploading the observed data set to an administrative rule set database, comparing the observed data set to an ideal data set for the injury, wherein the ideal data set is determined according to the administrative rule set for the injury and based on a comparison of the observed data set to the ideal data set, outputting a risk score for the impairment rating. In some embodiments, the impairment rating comprises a maximum medical improvement. In some embodiments, the risk score is uploaded to a historical evaluation database for the creation of a percentile score based on one or more additional risk scores for similar body systems. In some of these embodiments, the percentile score created is based on a comparison to risk scores across all providers that have performed a similar exam. In further embodiments, the percentile score is created based on a comparison to risk scores of medical providers for the same specialty that have performed a similar exam. In some embodiments, the percentile score is created based on a comparison to risk scores of one or more doctors for a specific employer that have performed a similar exam. In some embodiments, the percentile score is created based on a comparison to risk scores of medical providers used by a specific insurance company that have performed a similar exam. In further embodiments, the percentile score is created based on a comparison to risk scores of risk scores of medical providers within a specific area that have performed a similar exam. In further embodiments, the percentile score is created based on a comparison to risk scores of medical providers within a specific zip code that have performed a similar exam.

In another aspect, a system for calculating a risk score for an impairment rating comprises an observed data set input configured to receive one or more observed data values of an observed data set, an administrative rule set database configured for receiving the observed data set and comparing the observed data set to an ideal data set for the injury, wherein the ideal data set is determined according to an administrative rule set for the injury and an impairment rating output, wherein the impairment rating output is configured to output a risk score for an impairment rating based on a comparison of the observed data set with the ideal data set. In some embodiments, the impairment rating comprises a maximum medical improvement. In some embodiments, the administrative rule set database comprises a HIPAA compliant database. In some embodiments, the system comprises a historical evaluation database configured to compare the risk score to one or more additional risk scores for similar body systems. In some embodiments, based on the comparison of the risk score to the one or more additional risk scores for similar body systems, a percentile score for the impairment rating is created. In some of these embodiments, the percentile score is created based on a comparison to risk scores of medical providers for the same specialty that have performed a similar exam. In some embodiments, the percentile score is created based on a comparison to risk scores of one or more doctors for a specific employer that have performed a similar exam. In further embodiments, the percentile score is created based on a comparison to risk scores of medical providers used by a specific insurance company that have performed a similar exam. In some embodiments, the percentile score is created based on a comparison to risk scores of risk scores of medical providers within a specific area that have performed a similar exam. In further embodiments, the percentile score is created based on a comparison to risk scores of medical providers within a specific zip code that have performed a similar exam.

In a further aspect, a method of creating one or more percentile scores based on one or more additional risk scores for similar body systems comprises uploading a risk score for an impairment rating to a historical evaluation database, comparing the risk score to one or more additional risk scores for similar body systems and based on the comparison of the risk score to the one or more additional risk scores for similar body systems, creating a percentile score for the impairment rating. In some embodiments, the percentile score is created based on a comparison to risk scores across all providers that have performed a similar exam. In some embodiments, the percentile score is created based on a comparison to risk scores of medical providers for the same specialty that have performed a similar exam. In further embodiments, the percentile score is created based on a comparison to risk scores of one or more doctors for a specific employer that have performed a similar exam. In still further embodiment, the percentile score is created based on a comparison to risk scores of medical providers used by a specific insurance company that have performed a similar exam. In some embodiments, the percentile score is created based on a comparison to risk scores of risk scores of medical providers within a specific area that have performed a similar exam. In some embodiments, the percentile score is created based on a comparison to risk scores of medical providers within a specific zip code that have performed a similar exam.

In still a further aspect, a method of calculating a risk score for an impairment rating in a worker's compensation claim and creating one or more percentile scores based on one or more additional risk scores for similar body systems comprises performing one or more tests on an injured worker to obtain an observed data set, uploading the observed data set to an administrative rule set database, comparing the observed data set to an ideal data set for the injury, wherein the ideal data set is determined according to the administrative rule set for the injury, based on a comparison of the observed data set to the ideal data set, outputting a risk score for the impairment rating, uploading the risk score for the impairment rating to a historical evaluation database, comparing the risk score to one or more additional risk scores for similar body systems and based on the comparison of the risk score to the one or more additional risk scores for similar body systems, creating a percentile score for the impairment rating.

BRIEF DESCRIPTION OF THE FIGURES

FIG. 3A illustrates an impairment rating report for treatment of an injury, in accordance with some embodiments.

FIG. 3B illustrates an impairment risk score and/or deficiency report for an impairment rating report, in accordance with some embodiments.

DETAILED DESCRIPTION

Embodiments of the invention are directed to a method and system for calculating a deficiency analysis that provides a percentage of missing data for an impairment rating based on an observed data set. Comparing an observed data set with an ideal data set based on one or more administrative rule sets (ARSs) for an injury event allows one or more stakeholders within the workers compensation process to obtain a risk score and/or deficiency report for the an observed data and the resulting impairment rating. One or more risk scores and/or deficiency reports can be used to track quality and consistency of a clinician and quality and consistency across a medical provider network. After a risk score for an impairment rating is output, the risk score can be uploaded to a historical evaluation database for a percentile creation against other reports of similar body systems.

Reference will now be made in detail to implementations of a method of and system for providing a confidence measurement in the impairment rating process as illustrated in the accompanying drawings. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
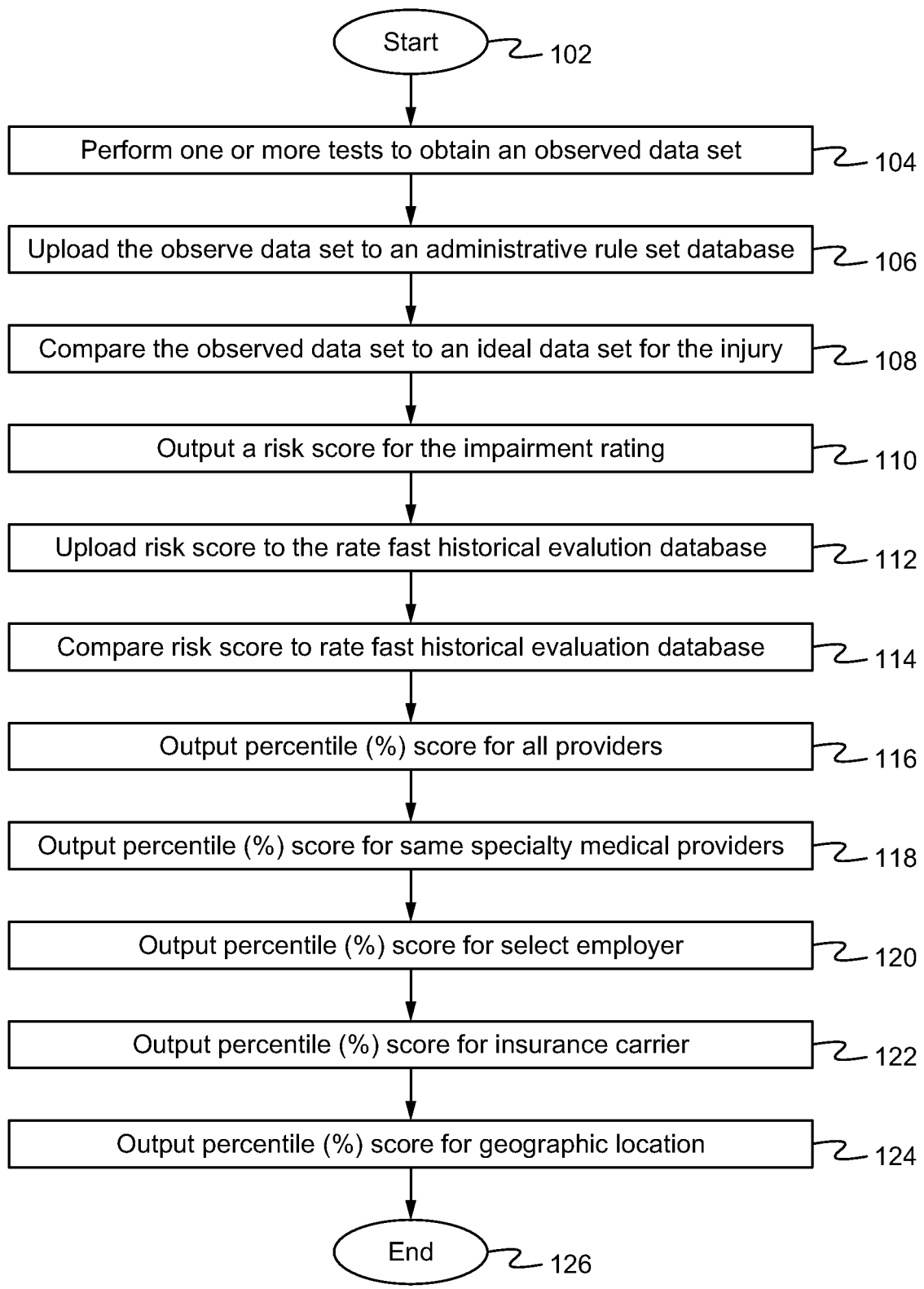
FIG. 1 illustrates a method of calculating a risk score for an impairment rating in a worker's compensation claim, in accordance with some embodiments.

Referring now to FIG. 1, a method of calculating a risk score for an impairment rating in a worker's compensation claim is depicted therein. The method begins in the step 102. In the step 104, one or more tests are performed on an injured worker to obtain an observed data set. The one or more tests performed by a treating clinician are guided according to one or more ARSs for the injury. In an embodiment, a shell program executing on the clinician's computing device controls a graphical user interface, guiding the clinician through data collection and entry process. The shell program encrypts and passes user and data sets over a network for further processing. In the step 106, the observed data set is uploaded to an administrative rule set database. In some embodiments, the observed data set is automatically uploaded to the administrative rule set database as the one or more tests are performed by the clinician. By facilitating data collection at the clinician's computing device, the shell program enables efficient use and performance of computing resources at the administrative rule set database. Then, in the step 108, the observed data set is compared to an ideal data set for the worker's injury and/or injuries. The ideal data set is determined according to the ARSs for the injuries. Specifically, the ideal data set assumes that all ARSs have been followed and correct values within the right and/or expected ranges have been entered. In the step 110, based on a comparison of the observed data set to the ideal data set, a risk score for the impairment rating is output.

In some embodiments, the risk score equals the percentage of data missing from the observed data set as determined by the ARSs and the ideal data set for the injury. In some embodiments the risk score may indicate that the clinician has failed to sufficiently replicate measurements and/or failed to take ancillary measurements. For example, ancillary measurements mean that if a worker has injured a left shoulder (injured shoulder) then the right shoulder (healthy shoulder) must also be measured to evaluate a worker's baseline function. If the clinician fails to take this and/or other measurements then this will show up in the risk score for the impairment rating. Non-compliance to the necessary rigor of a clinical data set required by the ARSs can lead to potential error and/or lack of confidence in the impairment rating value.

The risk score and/or deficiency analysis for the impairment rating provides a percentage of missing data within the observed data set. For example, the percentage of missing data that is necessary to support a comprehensive impairment rating and report. A zero percent risk score or deficiency report indicates that all ratable data has been provided for the impairment report and the one or more stakeholders can have confidence in the report. In some embodiments, the method enables the ability to assign confidence quintiles to a report and grade the quality of a data set A+ through F−. In some embodiments, the data set is graded on a five star rating system. Ultimately, the risk score or deficiency analysis designates a confidence rating in the impairment rating provided by the clinician and not the output. The risk score and/or deficiency analysis analyzes the quality of the data that the clinician has used to support the impairment rating. In some embodiments, the impairment rating comprises a maximum medical improvement.

In some embodiments, after the risk score for the impairment rating is output, the risk score is then uploaded to a historical evaluation database for a percentile creation against other reports of similar body systems. For example, such as shown within FIG. 1, in the step 112, the output risk score is uploaded to a historical evaluation database where it can be compared against other reports of similar body system. In the step 114, the risk score output in step 110, is compared to risk scores stored within the historical evaluation database. In the step, 116, based on the comparison of step 114, a percentile score is output for a comparison of the risk score across all providers that have performed a similar exam. In the step 118, a percentile score is output for a comparison of the risk score to medical providers for the same specialty that have performed a similar exam. Additionally, in some embodiments, in the step 120, a percentile score is output for a comparison of the risk score to one or more doctors for a specific employer that have performed a similar exam. In the step 122, a percentile score is output for a comparison of the risk score to medical providers used by a specific insurance company that have performed a similar exam. In the step 124, a percentile score is output for a comparison of the risk score to medical providers within a specific area that have performed a similar exam. For example, in some embodiments, the risk score is compared to medical providers within a specific zip code that have performed a similar exam. The method ends in the step 126.

Figure 2:
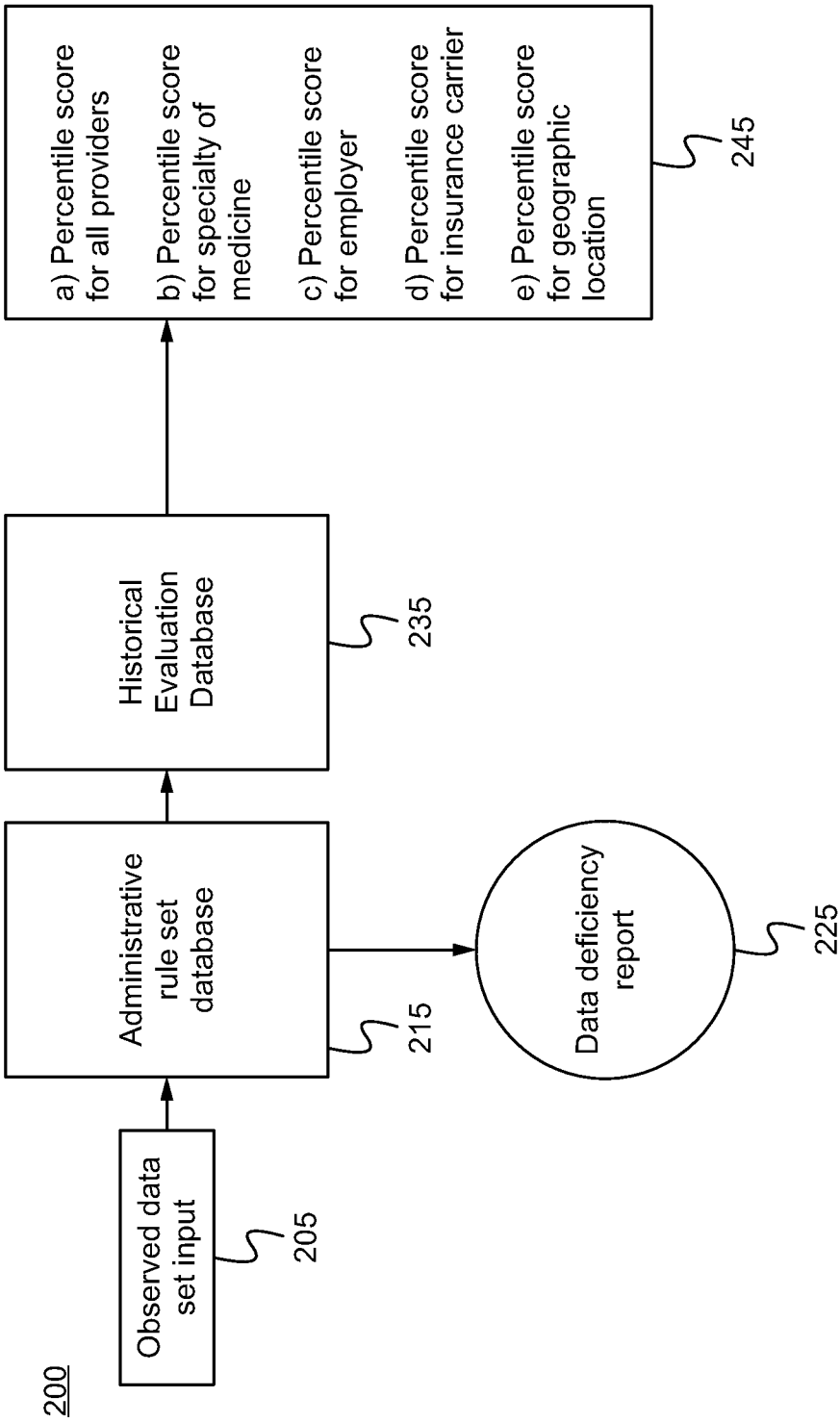
FIG. 2 illustrates a system for calculating a risk score for an impairment rating and one or more percentile scores, in accordance with some embodiments.

FIG. 2 illustrates a system for calculating a risk score for an impairment rating and one or more percentile scores. As shown within FIG. 2, the system 200 comprises an observed data set input 205, an administrative rule set database 215 and an impairment rating risk score output 225. The observed data set input is configured to receive one or more observed data values of an observed data set. The observed data values are based on one or more tests performed on an injured worker by a treating clinician. As described above, the one or more tests are guided according to one or more ARSs for the injury. The administrative rule set database 215 is configured to receive the observed data set. In some embodiments, the observed data set is automatically uploaded to the administrative rule set database 215 as the one or more tests are performed by the clinician. In some embodiments, the database 215 comprises a HIPAA compliant database.

After receiving the observed data set, the administrative rule set database 215 compares the observed data set to an ideal dat set for the injury. As described above, the ideal data set assumes that all ARSs have been followed and correct values within the right and/or expected ranges have been entered. Based on a comparison of the observed data set to the ideal data set, a risk score for the impairment rating is created within a data deficiency report 225 where it can be viewed by one or more interested stakeholders. As described above, in some embodiments, the risk score equals the percentage of data missing from the observed data set as determined by the ARSs and the ideal data set for the injury. In some embodiments, the impairment rating comprises a maximum medical improvement.

As further shown within FIG. 2 and as described above, in some embodiments, after the risk score for the impairment rating is output, the observed data set is then uploaded to a historical evaluation database 235 for one or more percentile scores 245 based on other reports of similar body systems. As shown within FIG. 2, in some embodiments, the risk score is used to create a percentile score for a comparison of one or more of the risk score across all providers that have performed a similar exam, the risk score to medical providers for the same specialty that have performed a similar exam, the risk score to one or more doctors for a specific employer that have performed a similar exam, the risk score to medical providers used by a specific insurance company that have performed a similar exam, the risk score to medical providers within a specific area that have performed a similar exam and the risk score is compared to medical providers within a specific zip code that have performed a similar exam. However, the risk score is able to be compared to any other similar scores as appropriately desired. Particularly, such as described above, comparing the risk score for the impairment rating against a historical database enables one or more stakeholders to further track and quantify the quality of the data set.

FIG. 3A illustrates an impairment rating report for treatment of an injury to the lumbar spine. As shown within the report 310, the injured worker has been rated as having no impairment and given a 0% Whole Person Impairment rating (0% WPI) 315. The WPI is the final impairment value assigned when all data within the clinical data set for the injury has been determined and advanced through the hierarchy of impairment.

As further shown within FIG. 3A, the injury has been evaluating using a DRE method 311 and a ROM method 313. The DRE "Diagnosis Related Estimate" or DBE "Diagnosis Based Estimates" 311 relies on the physician's judgment, training, experience and skill to arrive at a diagnosed impairment rating. The ROM method 313 utilizes an objective data set that evolves from physical measurement of the mobility range of the body part under examination.

Utilizing both of the DRE and the ROM methods allows a fairer, more accurate, reproducible and more complete analysis of the claimed medical conditions by using specific input analysis of digitized data for the spine including subjective complaints, functional measurements, static measurements, and diagnostic testing. As a result, each method (DRE and ROM) are simultaneously considered, compared, rated for WPI. Consequently, a determination is possible for first, the most accurate rating method representation, followed by a selection of the highest WPI value if both conditions are equally represented by the data. As shown within FIG. 3A, the DRE method 311 has given a 0% WPI 312 and the ROM method 313 has given a 0% WPI 314.

Based only on the impairment rating report the treating clinician and the case management of the treating clinician has correctly healed the worker, with no further impairment and a rating of 0% WPI.

FIG. 3B illustrates an impairment risk score and/or deficiency report for the impairment rating report such as described within FIG. 3A. The impairment risk score and/or deficiency report 320 may be output as report so that it can be viewed by one or more interested stakeholders, such as described above. As described above, in some embodiments, the risk score equals the percentage of data missing from the observed data set as determined by the ARSs and the ideal data set for the injury.

In some embodiments, the report 320 comprises the name of the treating physician 321, the date of the report 323, the injured body system 325 and the body part 325. However, the report 320 is able to comprise more or less information as appropriately desired. As shown within FIG. 3B, the deficiency report 320 indicates a total data set deficiency score 322 of D+ indicating that 31.7% of the total data is missing, a subjective complaints deficiency score 324 of B, 16.7% missing data and an objective findings deficiency 326 of F, 82.6% missing data.

As described above, the risk score and/or deficiency report provides a percentage of missing data. For example, the percentage of missing data that is necessary to support a comprehensive impairment rating and report. A zero percent risk score or deficiency report indicates that all ratable data has been provided for the impairment report and the one or more stakeholders can have confidence in the report. In some embodiments, the method enables the ability to assign confidence quintiles to a report and grade the quality of a data set A+ through F−. Ultimately, the risk score or deficiency analysis designates a confidence rating in the impairment rating provided by the clinician and not the output.

Thus, while the impairment rating report such as described within FIG. 3A indicated no further impairment and a rating of 0% WPI, based on the deficiency report 320, it is not clear whether this impairment rating is wholly accurate. Because, the one or more ARSs were not properly followed, the one or more stakeholders cannot have proper confidence in the 0% WPI and the treatment of the injured individual.

Based on the deficiency report 320, the treating clinician has not properly followed all applicable ARSs for the injured individual. Thus, it is likely that the treating physician needs to complete further learning and/or training to properly adhere to the ARSs for the injury. Particularly, as described above, the risk score equals the percentage of data missing from the observed data set as determined by the ARSs and the ideal data set for the injury. The risk score may indicate that the clinician has failed to sufficiently replicate measurements and/or failed to take ancillary measurements. If the clinician fails to take this and/or other measurements then this will show up in the risk score for the impairment rating. Non-compliance to the necessary rigor of a clinical data set required by the ARSs can lead to potential error and/or lack of confidence in the impairment rating value. In an embodiment, a personalized online playlist of one or more educational modules can be generated for training the treating physician to adhere to the ARSs for the injury. The one or more educational modules may be ordered according to respective scores associated with the deficiencies found in the impairment rating report. The personalized online playlist may be included in the deficiency report 320.

In operation, comparing an observed data set with an ideal data set based on one or more ARSs for an injury event allows one or more stakeholders within the workers compensation process to obtain a risk score and/or deficiency report for the observed data and the resulting impairment rating. One or more risk scores and/or deficiency reports can be used to track quality and consistency of a clinician and quality and consistency across a medical provider network.

Additionally, the risk score or deficiency analysis can be used for one or more stakeholders such as an account administrator or other stakeholder to track consistency of outcomes across a clinician's patients and also across a medical provider network (MPN) for querying quality control, consistency and completeness of reports. This also enables an opportunity for correctional interventions within a network and an improvement in the quality of the report produced for stakeholders. The data can also be analyzed for statistical variance within an individual report, a clinician's account and across the MPN. Additionally, after a risk score for an impairment rating is output, the risk score can be uploaded to a historical evaluation database for a percentile creation against other reports of similar body systems. This can further enable a determination of best practices and behaviors such that a more complete and accurate impairment rating is obtained in an educational and constructive manner. As such, the method and system for calculating a deficiency analysis that provides a percentage of missing data for an impairment rating based on an observed data set such as described herein has many advantages.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

I claim:

1. A computer-implemented method of providing a deficiency analysis to improve quality and consistency of a clinician and quality and consistency across a medical provider network, the method comprising:
receiving, at an administrative rule set database from a client computer, encrypted data including an observed data set for an injury, wherein the observed data set is obtained from one or more tests performed by a clinician on an injured worker and encrypted by a shell program executing on the client computer and transmitted to the administrative rule set database by the shell program to improve computing performance at the administrative rule set database, wherein the shell program controls a graphical user interface guiding the clinician through data collection and entry process by:
driving a particular data collection sequence by dynamically generating a set of entry fields that is specific to the injured worker, wherein driving the specific data collection sequence comprises prompting a plurality of adaptively generated entry fields each based on at least the injury and a range of data entered in a previous entry field, thereby expanding the observed data set such that only necessary data is collected for an impairment rating determination of the injured worker, wherein input for a first body part affects a second body part based on a primary injury causing a secondary injury, which affects the impairment rating determination, wherein accuracy and integrity of the impairment rating determination for the injured worker are verified using statistical model and pattern recognition, wherein the statistical model evaluates input data for anomalies and outliers, and when the pattern recognition detects data that falls within a specified range, an anomaly response is triggered,
selecting at least one administrative rule set from the plurality of administrative rule sets based on the particular data collection sequence; and
based on the at least one administrative rule set, performing real-time validation calculations of the observed data set as the observed data set is being entered and alerting the clinician when the real-time validation calculations indicate that entered input data is outside expected data ranges for the injury,
wherein the administrative rule set database includes ideal data sets for injuries as determined according to the at least one administrative rule set;
decrypting, at the administrative rule set database, the encrypted data to obtain observed data set;
comparing, at the administrative rule set database, the observed data set to an ideal data set, of the ideal data sets, for the injury to determine deficiencies in the observed data set, including determining that the observed data set is authentic and not synthesized;
based on the comparison of the observed data set to the ideal data set, determining, at the administrative rule set database, a risk score for the observed data set, wherein the risk score comprises a percentage of data missing from the observed data set as determined by the ideal data set;
generating, by the administrative rule set database, a personalized online playlist of one or more educational modules, as determined from the comparison, for training the clinician to adhere to the at least one administrative rule set for the injury, wherein the one or more educational modules are ordered according to respective scores associated with the deficiencies in the observed data set;
generating, by the administrative rule set database, a digital impairment deficiency report that includes the risk score and a hyperlink to the personalized online playlist; and
performing simultaneous calculations with a calculator engine using the administrative rule set database, wherein the calculator engine utilizes logic for missing or incomplete data entry requests to ensure validity of dependent data.

2. The method of claim 1, wherein an impairment rating associated with the observed data set comprises a maximum medical improvement.

3. The method of claim 1, wherein the risk score is uploaded to a historical evaluation database for the creation of a percentile score based on one or more additional risk scores for similar body systems.

4. The method of claim 3, wherein the percentile score created is based on a comparison to risk scores across all providers that have performed a similar exam.

5. The method of claim 3, wherein the percentile score is created based on a comparison to risk scores of medical providers for the same specialty that have performed a similar exam.

6. The method of claim 3, wherein the percentile score is created based on a comparison to risk scores of one or more doctors for a specific employer that have performed a similar exam.

7. The method of claim 3, wherein the percentile score is created based on a comparison to risk scores of medical providers used by a specific insurance company that have performed a similar exam.

8. The method of claim 3, wherein the percentile score is created based on a comparison to risk scores of medical providers within a specific area that have performed a similar exam.

9. The method of claim 3, wherein the percentile score is created based on a comparison to risk scores of medical providers within a specific zip code that have performed a similar exam.

10. A system for providing a deficiency analysis to improve quality and consistency of a clinician and quality and consistency across a medical provider network, the system comprising:
an administrative rule set database including ideal data sets for injuries as determined according to an administrative rule set for the injuries, wherein the administrative rule set database:
receives, from a client computer, encrypted data including an observed data set for an injury, wherein the observed data set is obtained from one or more tests performed by a clinician on an injured worker and encrypted by a shell program executing on the client computer and transmitted to the administrative rule set database by the shell program to improve computing performance at the administrative rule set database, wherein the shell program controls a graphical user interface guiding the clinician through data collection and entry process by:
driving a particular data collection sequence by dynamically generating a set of entry fields that is specific to the injured worker, wherein driving the specific data collection sequence comprises prompting a plurality of adaptively generated entry fields each based on at least the injury and a range of data entered in a previous entry field, thereby expanding the observed data set such that only necessary data is collected for an impairment rating determination of the injured worker, wherein input for a first body part affects a second body part based on a primary injury causing a secondary injury, which affects the impairment rating determination, wherein accuracy and integrity of the impairment rating determination for the injured worker are verified using statistical model and pattern recognition, wherein the statistical model evaluates input data for anomalies and outliers, and when the pattern recognition detects data that falls within a specified range, an anomaly response is triggered, selecting at least one administrative rule set from the plurality of administrative rule sets based on the particular data collection sequence; and based on the at least one administrative rule set, performing real-time validation calculations of the observed data set as the observed data set is being entered and alerting the clinician when the real-time validation calculations indicate that entered input data is outside expected data ranges for the injury, wherein the administrative rule set database includes ideal data sets for injuries as determined according to the at least one administrative rule set;

decrypts the encrypted data to obtain the observed data set;

compares the observed data set to an ideal data set, of the ideal data sets, for the injury to determine deficiencies in the observed data set, including determining that the observed data set is authentic and not synthesized;

based on the comparison of the observed data set and the ideal data set, determines a risk score for the observed data set, wherein the risk score comprises a percentage of data missing from the observed data set as determined by the ideal data set;

generates a personalized online playlist of one or more educational modules, as determined from the comparison, for training the clinician to adhere to the at least one administrative rule set for the injury, wherein the one or more educational modules are ordered according to respective scores associated with the deficiencies in the observed data set;

generates a digital impairment deficiency report that includes the risk score and a hyperlink to the personalized online playlist; and performing simultaneous calculations with a calculator engine using the administrative rule set database, wherein the calculator engine utilizes logic for missing or incomplete data entry requests to ensure validity of dependent data.

11. The system of claim 10, wherein an impairment rating associated with the observed data set comprises a maximum medical improvement.

12. The system of claim 10, wherein the administrative rule set database comprises a HIPAA compliant database.

13. The system of claim 10, further comprising a historical evaluation database configured to compare the risk score to one or more additional risk scores for similar body systems.

14. The system of claim 13, wherein based on the comparison of the risk score to the one or more additional risk scores for similar body systems, a percentile score for the impairment rating is created.

15. The system of claim 14, wherein the percentile score is created based on a comparison to risk scores of medical providers for the same specialty that have performed a similar exam.

16. The system of claim 14, wherein the percentile score is created based on a comparison to risk scores of one or more doctors for a specific employer that have performed a similar exam.

17. The system of claim 14, wherein the percentile score is created based on a comparison to risk scores of medical providers used by a specific insurance company that have performed a similar exam.

18. The system of claim 14, wherein the percentile score is created based on a comparison to risk scores of risk scores of medical providers within a specific area that have performed a similar exam.

19. The system of claim 14, wherein the percentile score is created based on a comparison to risk scores of medical providers within a specific zip code that have performed a similar exam.

20. A computer-implemented method of providing a deficiency analysis to track quality and consistency of a clinician and quality and consistency across a medical provider network, the method comprising:

receiving, at an administrative rule set database from a client computer, encrypted data including an observed data set for an injury, wherein the observed data set is obtained from one or more tests performed by a clinician on an injured worker and encrypted by a shell program executing on the client computer and transmitted to the administrative rule set database by the shell program to improve computing performance at the administrative rule set database, wherein the shell program controls a graphical user interface guiding the clinician through data collection and entry process by:

driving a particular data collection sequence by dynamically generating a set of entry fields that is specific to the injured worker, wherein driving the specific data collection sequence comprises prompting a plurality of adaptively generated entry fields each based on at least the injury and a range of data entered in a previous entry field, thereby expanding the observed data set such that only necessary data is collected for an impairment rating determination of the injured worker, wherein input for a first body part affects a second body part based on a primary injury causing a secondary injury, which affects the impairment rating determination, wherein accuracy and integrity of the impairment rating determination for the injured worker are verified using statistical model and pattern recognition, wherein the statistical model evaluates input data for anomalies and outliers, and when the pattern recognition detects data that falls within a specified range, an anomaly response is triggered, selecting at least one administrative rule set from the plurality of administrative rule sets based on the particular data collection sequence; and based on the at least one administrative rule set, performing real-time validation calculations of the observed data set as the observed data set is being entered and alerting the clinician when the real-time validation calculations indicate that entered input data is outside expected data ranges for the injury, wherein the administrative rule set database includes ideal data sets for injuries as determined according to the at least one administrative rule set;

decrypting, at the administrative rule set database, the encrypted data to obtain the observed data set;

comparing, at the administrative rule set database, the observed data set to an ideal data set, of the ideal data sets, for the injury to determine deficiencies in the observed data set, including determining that the observed data set is authentic and not synthesized;

based on the comparison of the observed data set to the ideal data set, determining, at the administrative rule set database, a risk score for the observed data set, wherein the risk score comprises a percentage of data missing from the observed data set as determined by the ideal data set;

generating, by the administrative rule set database, a personalized online playlist of one or more educational modules, as determined from the comparison, for training the clinician to adhere to the at least one administrative rule set for the injury, wherein the one or more educational modules are ordered according to respective scores associated with the deficiencies in the observed data set;

generating, by the administrative rule set database, a digital impairment deficiency report that includes the risk score and a hyperlink to the personalized online playlist;

performing simultaneous calculations with a calculator engine using the administrative rule set database, wherein the calculator engine utilizes logic for missing or incomplete data entry requests to ensure validity of dependent data;

receiving the risk score for the observed data set at a historical evaluation database, wherein the historical evaluation database includes a plurality of risk scores for body systems;

comparing, at the historical evaluation database, the risk score to one or more additional risk scores, of the plurality of risk scores, for a body system associated with the injury; and based on the comparison of the risk score to the one or more additional risk scores, creating a percentile score for the impairment rating.

21. The method of claim 20, wherein the percentile score is created based on a comparison to risk scores across all providers that have performed a similar exam.

22. The method of claim 20, wherein the percentile score is created based on a comparison to risk scores of medical providers for the same specialty that have performed a similar exam.

23. The method of claim 20, wherein the percentile score is created based on a comparison to risk scores of one or more doctors for a specific employer that have performed a similar exam.

24. The method of claim 20, wherein the percentile score is created based on a comparison to risk scores of medical providers used by a specific insurance company that have performed a similar exam.

25. The method of claim 20, wherein the percentile score is created based on a comparison to risk scores of risk scores of medical providers within a specific area that have performed a similar exam.

26. The method of claim 20, wherein the percentile score is created based on a comparison to risk scores of medical providers within a specific zip code that have performed a similar exam.

27. A system for providing a deficiency analysis to track quality and consistency of a clinician and quality and consistency across a medical provider network, the system comprising:

an administrative rule set database including ideal data sets for injuries as determined according to an administrative rule set for the injuries, wherein the administrative rule set database:

receives, from a client computer, encrypted data including an observed data set for an injury, wherein the observed data set is obtained from one or more tests performed by a clinician on an injured worker and encrypted by a shell program executing on the client computer and transmitted to the administrative rule set database by the shell program to improve computing performance at the administrative rule set database, wherein the shell program controls a graphical user interface guiding the clinician through data collection and entry process by:

driving a particular data collection sequence by dynamically generating a set of entry fields that is specific to the injured worker, wherein driving the specific data collection sequence comprises prompting a plurality of adaptively generated entry fields each based on at least the injury and a range of data entered in a previous entry field, thereby expanding the observed data set such that only necessary data is collected for an impairment rating determination of the injured worker, wherein input for a first body part affects a second body part based on a primary injury causing a secondary injury, which affects the impairment rating determination, wherein accuracy and integrity of the impairment rating determination for the injured worker are verified using statistical model and pattern recognition, wherein the statistical model evaluates input data for anomalies and outliers, and when the pattern recognition detects data that falls within a specified range, an anomaly response is triggered, selecting at least one administrative rule set from the plurality of administrative rule sets based on the particular data collection sequence; and based on the at least one administrative rule set, performing real-time validation calculations of the observed data set as the observed data set is being entered and alerting the clinician when the real-time validation calculations indicate that entered input data is outside expected data ranges for the injury, wherein the administrative rule set database includes ideal data sets for injuries as determined according to the at least one administrative rule set;

decrypts the encrypted data to obtain the observed data set;

compares the observed data set to an ideal data set, of the ideal data sets, for the injury to determine deficiencies in the observed data set, including determining that the observed data set is authentic and not synthesized;

based on the comparison of the observed data set and the ideal data set, determines a risk score for the observed data set, wherein the risk score comprises a percentage of data missing from the observed data set as determined by the ideal data set;

generates a personalized online playlist of one or more educational modules, as determined from the comparison, for training the clinician to adhere to the at least one administrative rule set for the injury, wherein the one or more educational modules are ordered according to respective scores associated with the deficiencies in the observed data set;

generates a digital impairment deficiency report that includes the risk score and a hyperlink to the personalized online playlist; and performing simultaneous calculations with a calculator engine using the administrative rule set database, wherein the calculator engine utilizes logic for missing or incomplete data entry requests to ensure validity of dependent data; and a historical evaluation database including a plurality of risk scores for body systems, wherein the historical evaluation database:

receives the risk score for the observed data set;

compares the risk score to the one or more additional risk scores, of the plurality of risk scores, for a body system associated with the injury; and based on the comparison of the risk score to the one or more additional risk scores, creates a percentile score for the impairment rating.

\* \* \* \* \*